(12) United States Patent
Li et al.

(10) Patent No.: US 7,965,627 B2
(45) Date of Patent: Jun. 21, 2011

(54) QOS MEASUREMENT WITH SPLIT-PATH ZERO-LATENCY VIRTUAL JITTER BUFFER

(75) Inventors: San-qi Li, Plano, TX (US); Weijun Lee, Plano, TX (US); David Lu, Coppell, TX (US)

(73) Assignee: Genband US LLC, Plano, TX (US)

( * ) Notice: Subject to any disclaimer, the term of this patent is extended or adjusted under 35 U.S.C. 154(b) by 1213 days.

(21) Appl. No.: 11/081,998

(22) Filed: Mar. 16, 2005

(65) Prior Publication Data

US 2006/0062216 A1   Mar. 23, 2006

Related U.S. Application Data (60) Provisional application No. 60/611,221, filed on Sep. 18, 2004.

(51) Int. Cl.
*H04L 12/26* (2006.01)
*H04L 12/56* (2006.01)

(52) U.S. Cl. ........................ 370/229; 370/401

(58) Field of Classification Search ........................ None
See application file for complete search history.

(56) References Cited

U.S. PATENT DOCUMENTS

| | | | |
|---|---|---|---|
| 5,570,346 A * | 10/1996 | Shur | 370/231 |
| 6,510,219 B1 * | 1/2003 | Wellard et al. | 379/221.01 |
| 6,781,996 B1 * | 8/2004 | Hemmady | 370/395.21 |
| 7,072,961 B1 * | 7/2006 | Maclean et al. | 709/224 |
| 2002/0126674 A1 * | 9/2002 | Hemmady | 370/395.1 |
| 2003/0179705 A1 * | 9/2003 | Kojima | 370/230 |
| 2004/0071084 A1 * | 4/2004 | El-Hennawey et al. | 370/230 |
| 2006/0233102 A1 * | 10/2006 | Kusumoto | 370/229 |

\* cited by examiner

*Primary Examiner* — Ricky Ngo
*Assistant Examiner* — Clemence Han
(74) *Attorney, Agent, or Firm* — Jenkins, Wilson, Taylor & Hunt, P.A.

(57) ABSTRACT

An apparatus that includes a packet data ingress, a packet data egress, and a packet data switching matrix configured to switch packet data from the packet data ingress to the packet data egress. The apparatus may further include a packet data jitter buffer and a packet data splitter, wherein the packet data splitter interposes the packet data ingress and the packet data switching matrix and is configured to multicast the packet data to the packet data switching matrix and the jitter buffer.

23 Claims, 10 Drawing Sheets

QOS MEASUREMENT WITH SPLIT-PATH ZERO-LATENCY VIRTUAL JITTER BUFFER

This application claims the benefit of U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004, the entirety of which is hereby incorporated herein.

BACKGROUND

Voice-over-Internet-Protocol (VOIP) is used in IP telephony to send voice information in digital form in discrete packets rather than in the traditional circuit-committed protocols of the public switched telephone network (PSTN). In addition to IP, VoIP uses real-time transport protocol (RTP) to help ensure that packets get delivered in a timely manner. RTP combines its data transport with a real-time control protocol (RTCP) to, for example, monitor data delivery. Such monitoring allows the receiver to detect if there is any packet loss and to compensate for any delay jitter.

RTP works independently of underlying transport and network layer protocols. Information in the RTP header tells the receiver how to reconstruct the data and describes how the codec bit streams are packetized. RTP components include a sequence number used to detect lost packets, payload identification to describe media encoding, frame indication to mark the beginning and end of each frame, source identification to identify the originator of the frame, and intramedia synchronization to detect and compensate for different delay jitter within a single stream.

RTCP also works independently of underlying transport and network layer protocols. RTCP components include quality of service (QoS) feedback, which includes the numbers of lost packets, round-trip time, and jitter, so that the sources can adjust their data rates accordingly.

Jitter buffering is often necessary to measure the quality of service (QoS) metrics of a voice-over-Internet-Protocol (VoIP) session. For example, packet loss must be calculated after buffering and re-ordering received real-time transport protocol (RTP) packets. Without jitter buffering, the calculations of packet loss is inaccurate and tends to derive much higher loss than actual loss. This is also true for other QoS measurements, such as round-trip time.

However, jitter buffering introduces bearer path latency. Such latency in the nearer path is necessary in some case, but unnecessary in some scenarios, such as when both endpoints in a VoIP-to-VoIP session use the same codec and, thus, do not require any media transcoding functions. Inserting a jitter buffer in such transcoding-free VoIP-to-VoIP session can introduce unnecessary latency into the media path, which can negatively impact voice quality.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The following is at least a partial list of the acronyms that appear in the present disclosure. Those skilled in the art will readily recognize that the terms corresponding to each of the acronyms listed below may vary within the art, within the embodiments explicitly described herein, and within other embodiments within the scope of the present disclosure. Those skilled in the art will also understand that aspects of the present disclosure are not limited to applications pertaining specifically to any one or more of the following acronyms. Acronyms not listed below but otherwise mentioned or discussed herein should be recognized and understood by those skilled in the pertinent art within the context of the present disclosure. In the event that an acronym is employed in the present disclosure in a manner inconsistent with its usage in the art, the scope of the present disclosure is intended to include both the ordinary usage in the art and the specific usage herein.

ACRONYM TERM 2G second generation wireless technology
3G third generation wireless technology
3GPP third generation partnership project
3GPP2 third generation partnership project 2
AAL ATM adaptation layer
AAL2 AAL Type 2

Figure 1:
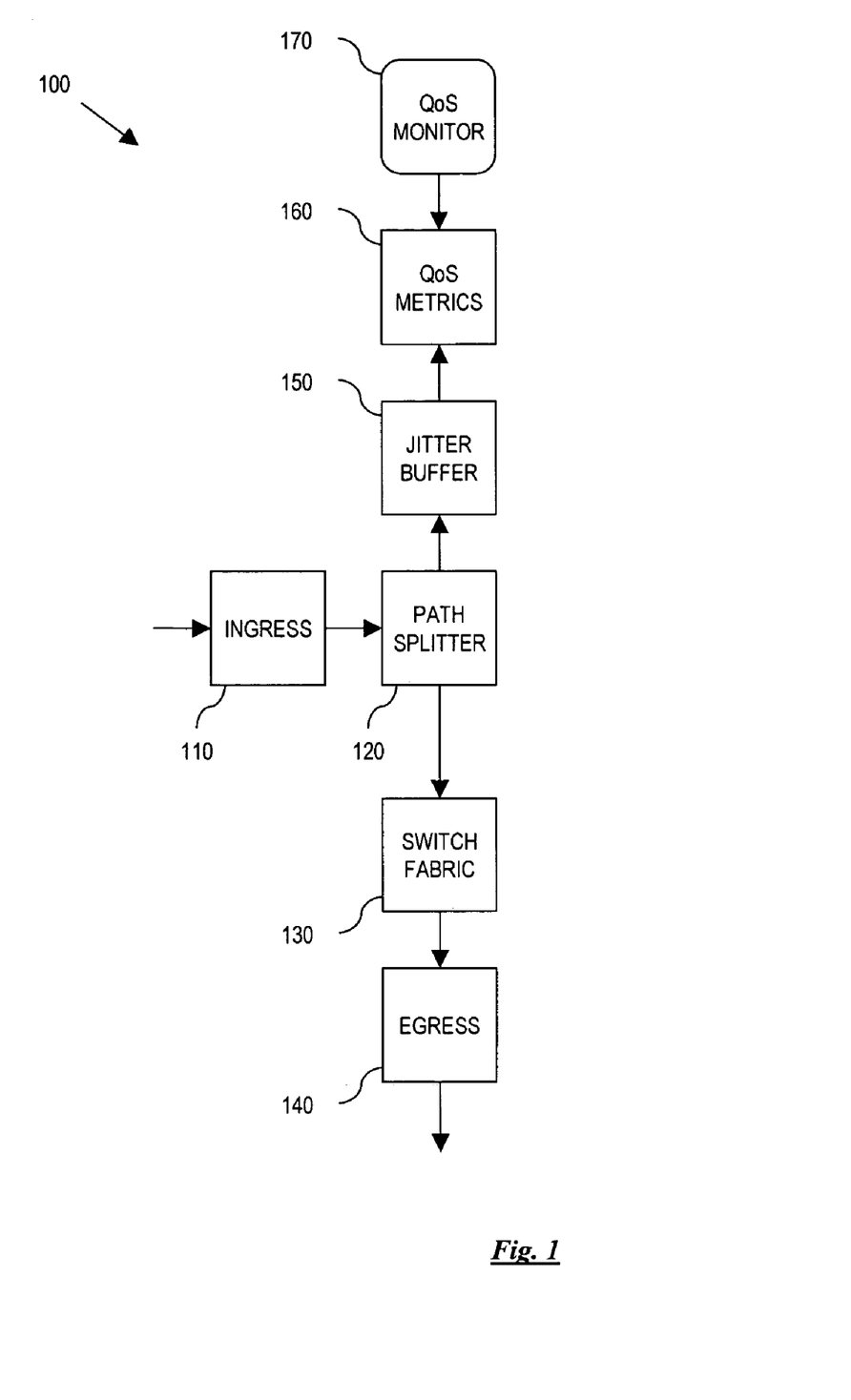
FIG. 1 is a schematic view of at least a portion of one embodiment of apparatus according to aspects of the present disclosure.

API application interface, also possibly referred to as application program interface or application programming interface
AMR adaptive multi-rate
ATM asynchronous transfer mode
CALEA Communications Assistance to Law Enforcement Act
CDMA code-division-multiple-access
CDMA2000 also known as IMT-CDMA Multi-Carrier or 1×RTT, is a code-division multiple access (CDMA) version of the IMT-2000 standard developed by the International Telecommunication Union (ITU)
CDR call detail record
DSL digital subscriber line
DSP digital signal processor
GPRS general packet radio service
HDLC high-level data link control
IP Internet Protocol
Iu interface between the RNS and the core network
IuCS circuit switched interface between 3G RNC and 3G MSC
IuPS packet switched interface between 3G RNC and 3G SGSN
IuFP Iu framing protocol
Iu UP Iu interface user plane
MEGACO media gateway control; control protocol between MG and MGC
MG media gateway
MGC media gateway controller
MSC mobile switching center
MSM multi-service module
Nb interface between media gateways
NP-NI non-packet network interface
NP-SM non-packet switching matrix
PCM pulse code modulation
PI packet interface (e.g., packet network interface)
P-NI packet network interface
POTS plain old telephone service
P-SM packet switching matrix
PSTN public switched telephone network
QoS quality of service
RAN radio access network
RNC radio network controller
RNS radio network station
RTCP real time transport control protocol, or real time control protocol, or control protocol related to RTP
RTP real-time-transport-protocol
SAP service access point
SAR segmentation and reassembly
SDR software defined radio
SS7 Signaling System 7
TDM time-division multiplexing
TFO tandem free operation
TrFO transcoder free operation
UMTS universal-mobile-telecommunications-service
VoDSL voice over DSL; e.g., voice delivered using DSL
VoIP voice over IP; e.g., voice delivered using the Internet Protocol
VoP voice over packet; e.g., voice delivered using packets
W-CDMA Wideband Code-Division Multiple Access
WMG media gateway which, in addition to wireless capabilities, may include wired or wireline switching, services, and/or other wired or wireline capabilities Referring to FIG. 1, illustrated is a schematic view of at least a portion of one embodiment of an apparatus 100 according to aspects of the present disclosure. The apparatus 100 may include, be, or be employed with a media gateway and/or a software switch ("softswitch"). Although not limited within the scope of the present disclosure, the media gateway may include, be, or be employed with one or more switches and/or other switching fabric components, IP gateways and/or other gateways, channel banks, and/or other devices. The media gateway may convert data from a format, protocol, and/or type required for one network to another format, protocol, and/or type required for another network, and/or otherwise convert data from a first type of data on a first transmission link to a second type of data on a second transmission link. The media gateway may terminate channels from a circuit-switched network and pass streaming media for a packet-switched network, such as RTP streams in an IP network. Input data for the media gateway may include audio, video, and/or T.120 (real-time multi-point communications), among others, which the media gateway may handle simultaneously or otherwise.

The media gateway may be deployed in conjunction with a media gateway controller, which is sometimes referred to as a softswitch. In some embodiments, the softswitch may include, be, or be employed with software for open application interface (API—also possibly referred to as application program interface or application programming interface).

As employed herein, a network may refer to an entire network or to a network portion, a network application, and/or network apparatus. To that end, one or more instances of the media gateway and/or softswitch, or components thereof, may be singularly or collectively employed to bridge two or more networks, including those of PSTNs and VoP networks, among others. PSTN networks may employ TDM, among other non-packet formats and/or protocols. VoP networks may employ ATM, VoIP, VoDSL, other formats and/or protocols, and/or combinations thereof. VoP networks may also employ wireless formats and/or protocols, such as UMTS, CDMA (such as CDMA2000 and/or W-CDMA), and/or combinations thereof, among others.

The apparatus 100 includes a packet data ingress 110, a data path splitter 120, a switch fabric 130, and a packet data egress 140. A jitter buffer 150, a QoS metrics module 160 and a QoS monitor module 170 are also depicted in FIG. 1. One or more of the jitter buffer 150, the QoS metrics module 160 and the QoS monitor module 170 may be integral to or otherwise included in or associated with the apparatus 100, or may be a discrete component coupled to the apparatus 100 by, for example, a data transmission link. One or more of the jitter buffer 150, the QoS metrics module 160 and the QoS monitor modules 170, among other possible components, may form a QoS measurement module.

The ingress 110 may be or include the physical interface or port at which data to be switched by the switch fabric 130 may be received by the apparatus 100, or one of several such ports. For example, the ingress 110 may be, include and/or support a variety of known and future-developed physical interfaces, including channelized and un-channelized interfaces. Thus, in some embodiments, the ingress 110 may be, include and/or support T1/E1, T2, OC-3/STM-1, and/or OC-12/STM-4 channelized interfaces, among others, as well as T1/E1, OC-3c/STM-1c, and OC-12c/STM-4c, and GigE un-channelized interfaces, among others. The ingress 110 may also include and/or support a variety of known and future-developed logical interfaces. For example, in one embodiment, the ingress 110 supports logical packet interfaces for SIP, SIP-T, MGCP, and MEGACO, among others.

The ingress 110 may also be one of a plurality of interfaces between the switch fabric 130 and packet and/or non-packet networks to which the apparatus 100 is coupled. Such interfaces may include packet data interfaces, such as one or more of the ingress 110, as well as non-packet data interfaces. Such non-packet data interfaces may be, include and/or support, for example, logical TDM and other non-packet interfaces for SS7/C7, PRI, CAS, MF, and Nb interfaces over ATM or IP, among others.

The ingress 110 may receive one or more of each of the following types of packet data: UMTS, CDMA2000, Iu UP/AAL2, ATM (possibly including AAL1 and/or AAL2), VoIP, and VoDSL. Such packet data may be multiplexed or non-multiplexed, as known in the art. In one embodiment, the apparatus 100 includes a plurality of ingresses 110 each corresponding to a specific one of such data types. For example, a first ingress 110 may receive UMTS data only, a second ingress 110 may receive ATM data only, and a third ingress 110 may receive VoIP data only.

The egress 140 may be substantially similar to the ingress 110, as described above, although the egress 140 is configured to send switched data away from the switch fabric 130 instead of to the switch fabric 130. However, in one embodiment, described more fully below, one or both of the ingress 110 and the egress 140 may physically and/or logically be two-way interfaces configured to send and receive data. Thus, in the schematic shown in FIG. 1, the ingress 110 and the egress 140 may be substantially similar interface components, or even identical interface components, except with regard to the direction of data flow therethrough during a specific telephony session. In such embodiments, the apparatus 100 may include more than one splitter 120, and/or the splitter 120 may physically and/or logically interpose the switch fabric 130 and more than one of the ingress 110 and the egress 140.

The switch fabric 130 may be configured to, among other functions, switch data between the ingress 110 and the egress 140. The data switched by the switch fabric 130 may be limited to packet data, such as VoIP data, VoDSL data, other VoP data, and/or ATM data, among others. Such packet data may alternatively or additionally include wireless packet data, such as UMTS data, CDMA2000 data, and Iu UP/AAL2 data, among others. However, the switch fabric 130 may also be configured to switch non-packet data, such as TDM data and/or other PSTN data, among others.

The switch fabric 130 may be or include one or more switching matrices. For example, in one embodiment, the switch fabric 130 includes one or more packet data switching matrices, and in another embodiment the switch fabric 130 also includes one or more non-packet data switching matrices. In one embodiment, the function and/or construction of the switch fabric 130 may be according to aspects provided in U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004.

The splitter 120 transmits the packet data received via the ingress 110 to the switch fabric 130, and also transmits at least a portion of the received packet data to the jitter buffer 150. Thus, in addition to the primary path from the ingress 110 to the switch fabric 130, the splitter 120 establishes a second path from the ingress 110 to the jitter buffer 150 and the QoS metrics module 160. Consequently, packet data can be sent to the switch fabric 130 and also be analyzed for QoS measurement without such analysis introducing latency.

In one embodiment, the splitter 120 transmits all packet data received via the ingress 110 to both the switch fabric 130 and the jitter buffer 150. In other embodiments, the splitter 120 transmits all packet data received via the ingress 110 to the switch fabric 130, but only transmits a portion of the received packet data to the jitter buffer 150. For example, the splitter 120 may only transmit to the jitter buffer 150 those portions of the received packet data that have session endpoints using different codecs or otherwise requiring one or more media transcoding functions.

The splitter 120 may be of conventional and/or future-developed design. For example, the splitter 120 be substantially similar to or include an ATM switch or switching means configured to perform "1-to-N" multicasting. The splitter 120 may alternatively, or additionally, be substantially similar to or include an IP hub, bridge and/or router configured to perform multicasting and/or broadcasting. The splutter 120 may alternative, or additionally, be substantially similar to or include software configured to relay incoming packets to multiple output queues.

The jitter buffer 150 may be substantially similar or identical in function, construction and/or other aspects to conventional and/or future-developed digital data buffers, including without limitation conventional jitter buffers and other packet data buffers, among others. The jitter buffer 150 may queue up to a predetermined number of packets, where the predetermined number may be configurable based on network conditions, needs and/or demands. However, the scope of the present disclosure is not limited to any particular buffer size or buffer sizing factors. The jitter buffer 150 may be a first-in-first-out (FIFO) buffer, a last-in-last-out (LILO) buffer, and a random buffer.

The QoS metrics module 160 may be substantially similar or identical in function, construction and/or other aspects to conventional and/or future-developed QoS data collection and/or measurement apparatus, and may be implemented as software executed by a dedicated processor or integral to other processing means within the apparatus 100. The QoS metrics module 160 may be configured to collect metrics employed to assess transmission rates, error rates, average delay, variation in delay among one or more groups of packets or cells, packet or cell losses, and/or other characteristics. The QoS metrics module 160 may additionally be configured to perform QoS assessment based on the collected metrics, although such assessment may also or alternatively be performed by another component internal or external to the apparatus 100.

For example, the QoS monitor module 170 may be configured to perform QoS assessment based on metrics collected by the QoS metrics module 160 and/or QoS assessments performed by the QoS metrics module 160. Thus, in some embodiments, the QoS monitor module 170 may be configured to merely query the QoS metrics module 160 for data to include in QoS reports, while in other embodiments the QoS monitor module 170 may be configured to query the QoS metrics module 160 for QoS metrics and/or assessments and subsequently perform its own QoS assessments for inclusion in QoS reports.

The QoS monitor module 170 may be integral to the apparatus 100. For example, the QoS monitor module 170 may share a backplane, bus or substrate with another component in the apparatus 100, or may be contained within the same housing, packaging or cabinet as another component in the apparatus 100. However, in other embodiments the QoS monitor module 170 may be a discrete component separate from the apparatus 100 and coupled to the apparatus 100 by a transmission link, for example. Consequently, the QoS monitor module 170 may be located central to or remote from the remainder of the apparatus 100.

In some embodiments, the functions of the jitter buffer 150, the QoS metrics module 160 and the QoS monitor module 170 may vary from those described above. In general, the combination of the jitter buffer 150 and the QoS metrics module 160, and possibly the QoS monitor module 170, may be configured to reorder the received packets (e.g., in the jitter buffer 150) and subsequently measure QoS metrics (e.g., by the QoS metrics module 160 and/or the QoS monitor module 170). Such QoS metrics may include packet loss, jitter and round-trip time, among others. These functions may be performed by or in an RTP packet processor, which may be integral to or composed from at least a portion of the jitter buffer 150 and/or the QoS metrics module 160.

These functions can be performed by employing a copy of the packet data received by the splitter 120 from the ingress 110, possibly substantially simultaneously with the propagation of the original packet data along the primary path through the switch fabric 130. Thus, at least in some embodiments, the QoS functions of the apparatus 100 may not introduce latency into the primary data path. Depending on the particular arrangement employed for the splitter 120, some latency may be attributable to the path splitting operation, in some embodiments. Nonetheless, in embodiments in which the splitter 120 introduces any noticeable latency, such latency may be substantially less than assessing QoS for packet data prior to switching the packet data.

Figure 2:
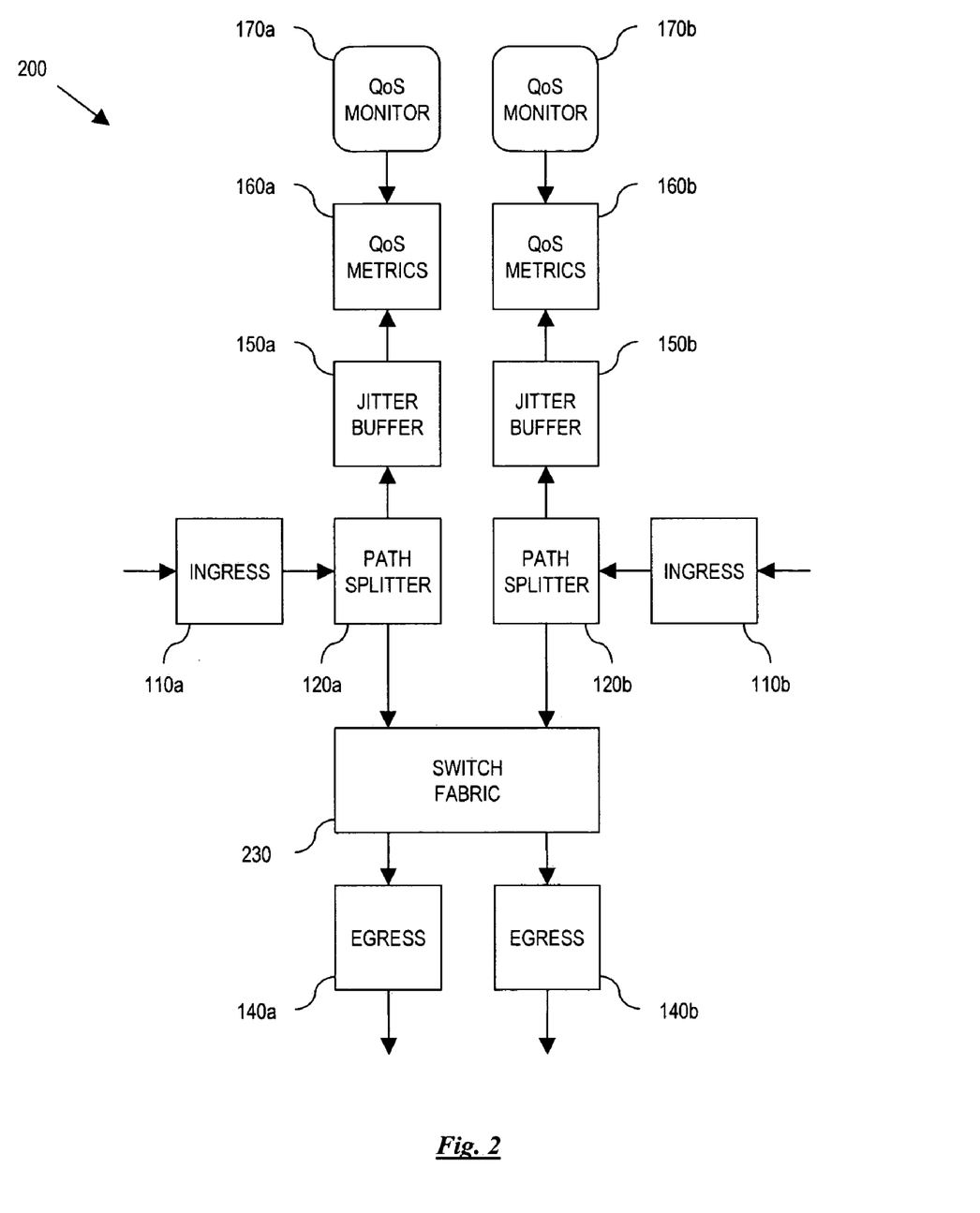
FIG. 2 is a schematic view of at least a portion of another embodiment of the apparatus shown in FIG. 1.

Referring to FIG. 2, illustrated is a schematic view of at least a portion of another embodiment of the apparatus 100 shown in FIG. 1, herein designated by the reference numeral 200. The apparatus 200 may be substantially similar to the apparatus 100, although the apparatus 200 includes multiple instances of the above-described components of the apparatus 100. For example, the apparatus 200 includes ingresses 110a, 110b which may each be substantially similar to the ingress 110. Similarly, the apparatus 200 includes splitters 120a, 120b, egresses 140a, 140b, jitter buffers 150a, 150b, QoS metric modules 160a, 160b, and QoS monitor modules 170a, 170b, each of which may be substantially similar to corresponding components of the apparatus 100 described above. Of course, although the apparatus 200 is illustrated as including two instances of the ingresses, 110a, 110b, the splitters 120a, 120b, the egresses 140a, 140b, the jitter buffers 150a, 150b, the QoS metric modules 160a, 160b, and the QoS monitor modules 170a, 170b, the apparatus 200 may include more than two of any of these components.

In one embodiment, the apparatus 200 may be substantially similar to an apparatus including two instances of the apparatus 100 shown in FIG. 1, where the two apparatus 100 may be employed with or share common switching means, such as a switch fabric 230. The switch fabric 230 may be substantially similar to the switch fabric 130, but may also be configured to receive data from more than one splitter 120a, 120b for switching to more than one egress 140a, 140b (although the switch fabric 130 may be similarly configured). The additional number of like components (e.g., the ingress 110b employed in addition to the ingress 110a) may be employed as redundant components, to increase bandwidth, or both.

Figure 3:
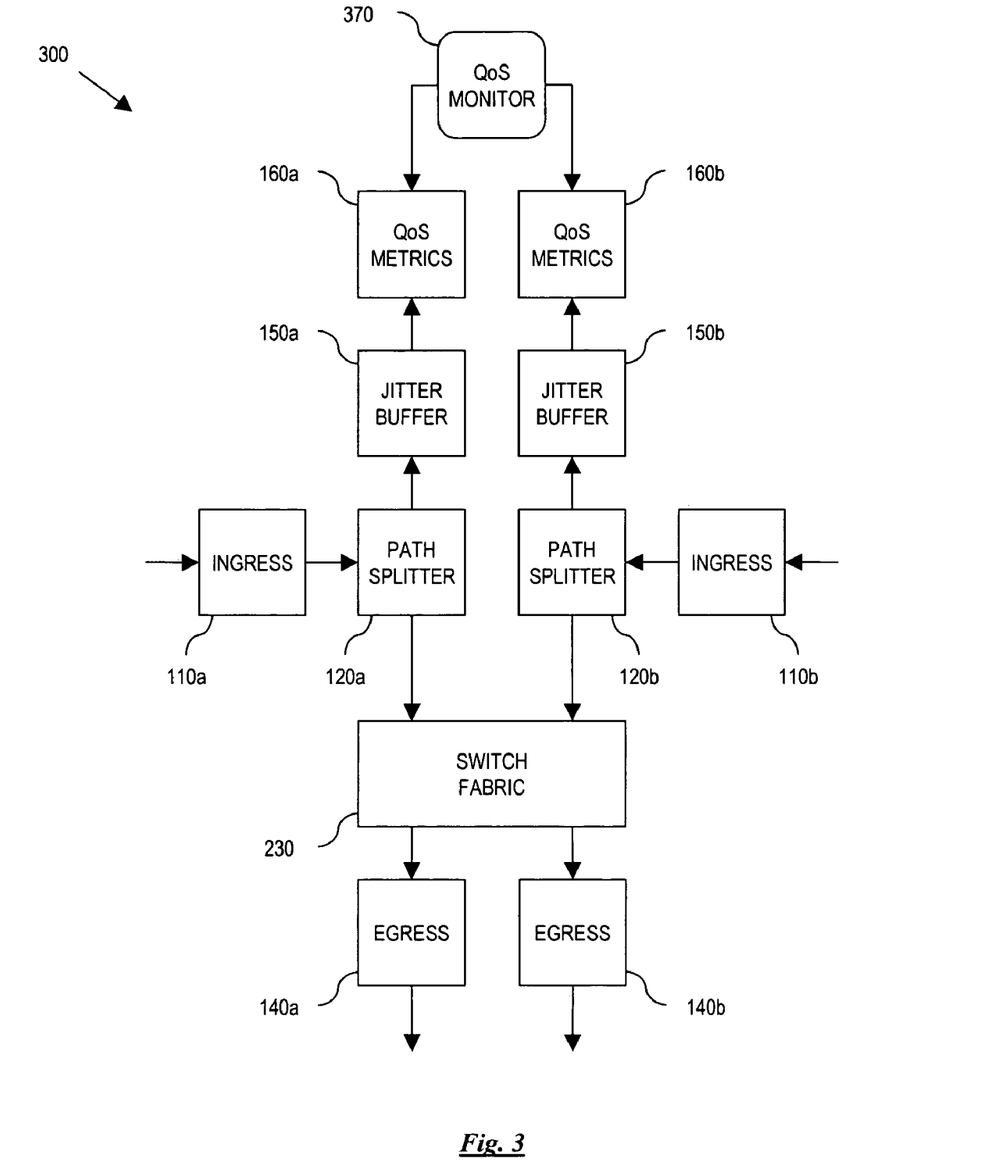
FIG. 3 is a schematic view of at least a portion of another embodiment of the apparatus shown in FIG. 1.

Referring to FIG. 3, illustrated is a schematic view of at least a portion of another embodiment of the apparatus 200 shown in FIG. 2, herein designated by the reference numeral 300. The apparatus 300 may be substantially similar to the apparatus 200, although the apparatus 300 includes (or is connected to) a common QoS monitor module 370. The QoS monitor module 370 may be substantially similar to the QoS monitor module 170 shown in FIG. 1, but may also be configured to communicate with multiple QoS metrics modules 160a, 160b. The apparatus 300 may include one or more QoS monitor modules 170 and/or one or more QoS monitor modules 370, where each QoS monitor module (170 and/or 370) may be configured to communicate with all or a corresponding one or more QoS metric modules 160a, 160b.

Figure 4:
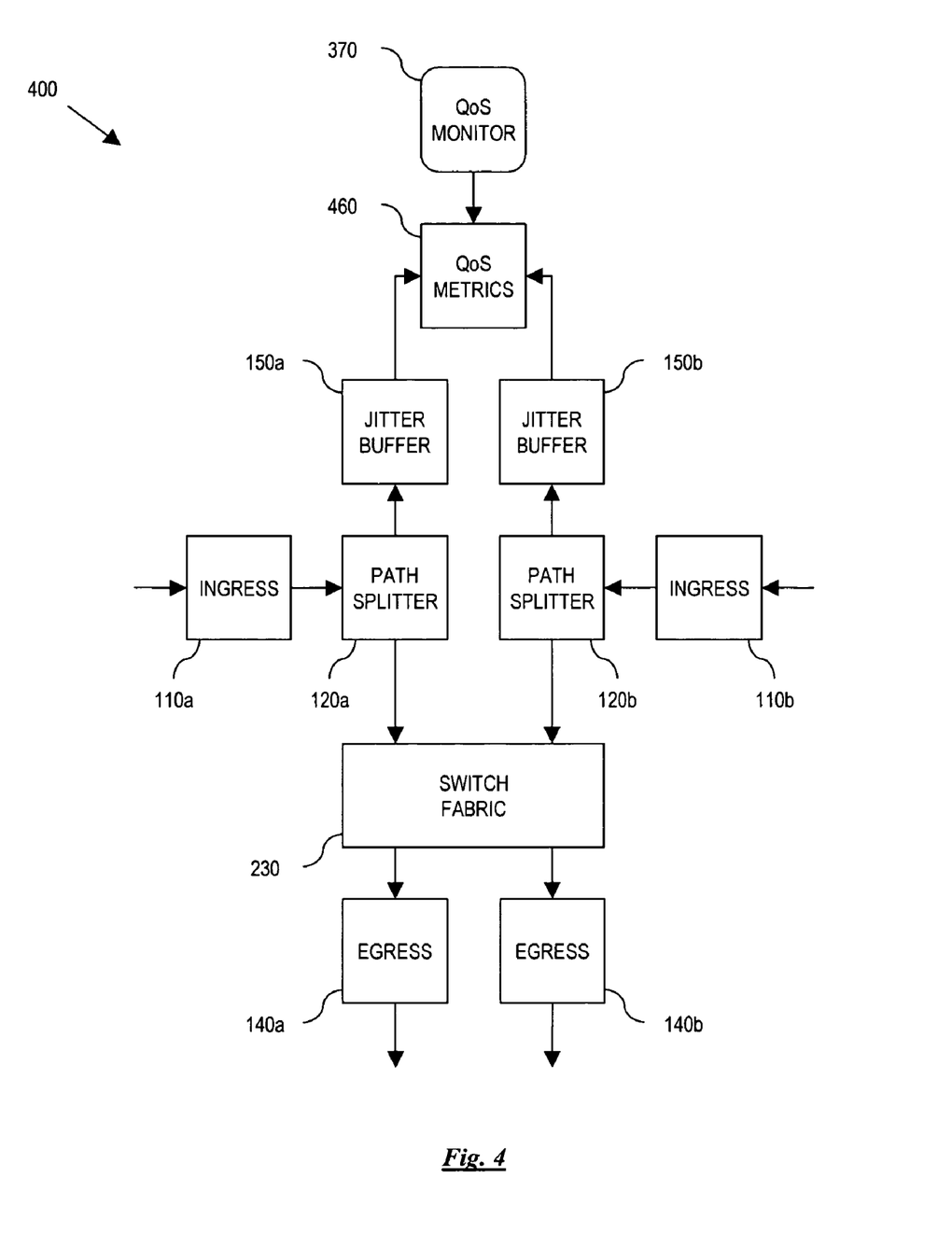
FIG. 4 is a schematic view of at least a portion of another embodiment of the apparatus shown in FIG. 1.

Referring to FIG. 4, illustrated is a schematic view of at least a portion of another embodiment of the apparatus 300 shown in FIG. 3, herein designated by the reference numeral 400. The apparatus 400 may be substantially similar to the apparatus 300, although the apparatus 400 includes (or is connected to) a common QoS metrics module 460. The QoS metrics module 460 may be substantially similar to the QoS metrics module 160 shown in FIG. 1, but may also be configured to communicate with multiple QoS monitor modules (170 and/or 370) and/or multiple jitter buffers 150a, 150b. The apparatus 400 may include one or more QoS metrics modules 160 and/or one or more QoS metrics modules 460, where each QoS metrics module (160 and/or 460) may be configured to communicate with all or a corresponding one or more QoS monitor modules (170 and/or 370) and all or a corresponding one or more jitter buffers 150a, 150b.

Figure 5:
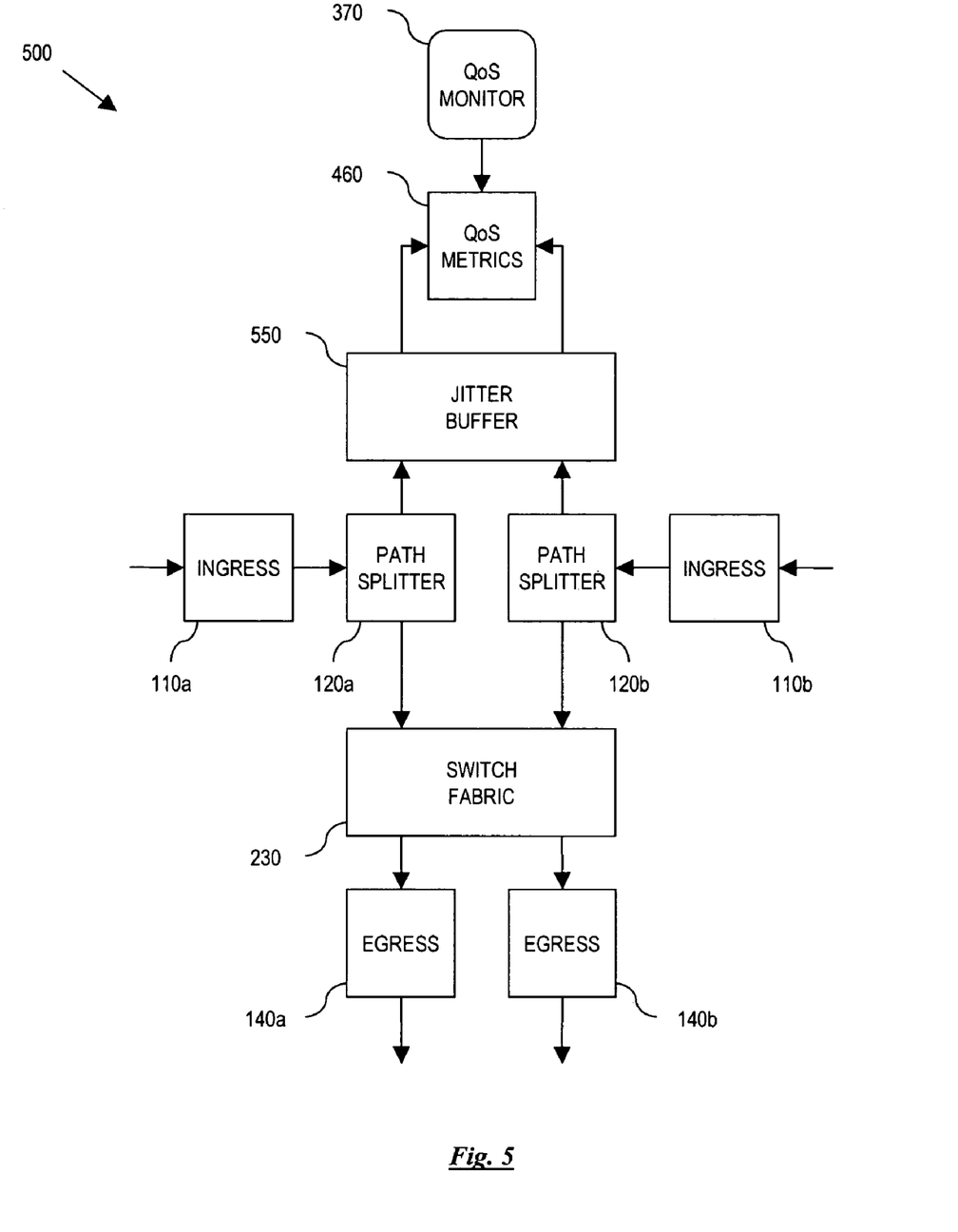
FIG. 5 is a schematic view of at least a portion of another embodiment of the apparatus shown in FIG. 1.

Referring to FIG. 5, illustrated is a schematic view of at least a portion of another embodiment of the apparatus 400 shown in FIG. 4, herein designated by the reference numeral 500. The apparatus 500 may be substantially similar to the apparatus 400, although the apparatus 500 includes (or is connected to) a common jitter buffer 550. The jitter buffer 550 may be substantially similar to the jitter buffer 150 shown in FIG. 1, but may also be configured to communicate with multiple QoS metrics modules (160 and/or 460) and/or multiple splitters 120a, 120b. The apparatus 500 may include one or more jitter buffers 150 and/or one or more jitter buffers 550, where each jitter buffer (150 and/or 550) may be configured to communicate with all or a corresponding one or more QoS metrics modules (160 and/or 460) and all or a corresponding one or more splitters 120a, 120b.

Figure 6:
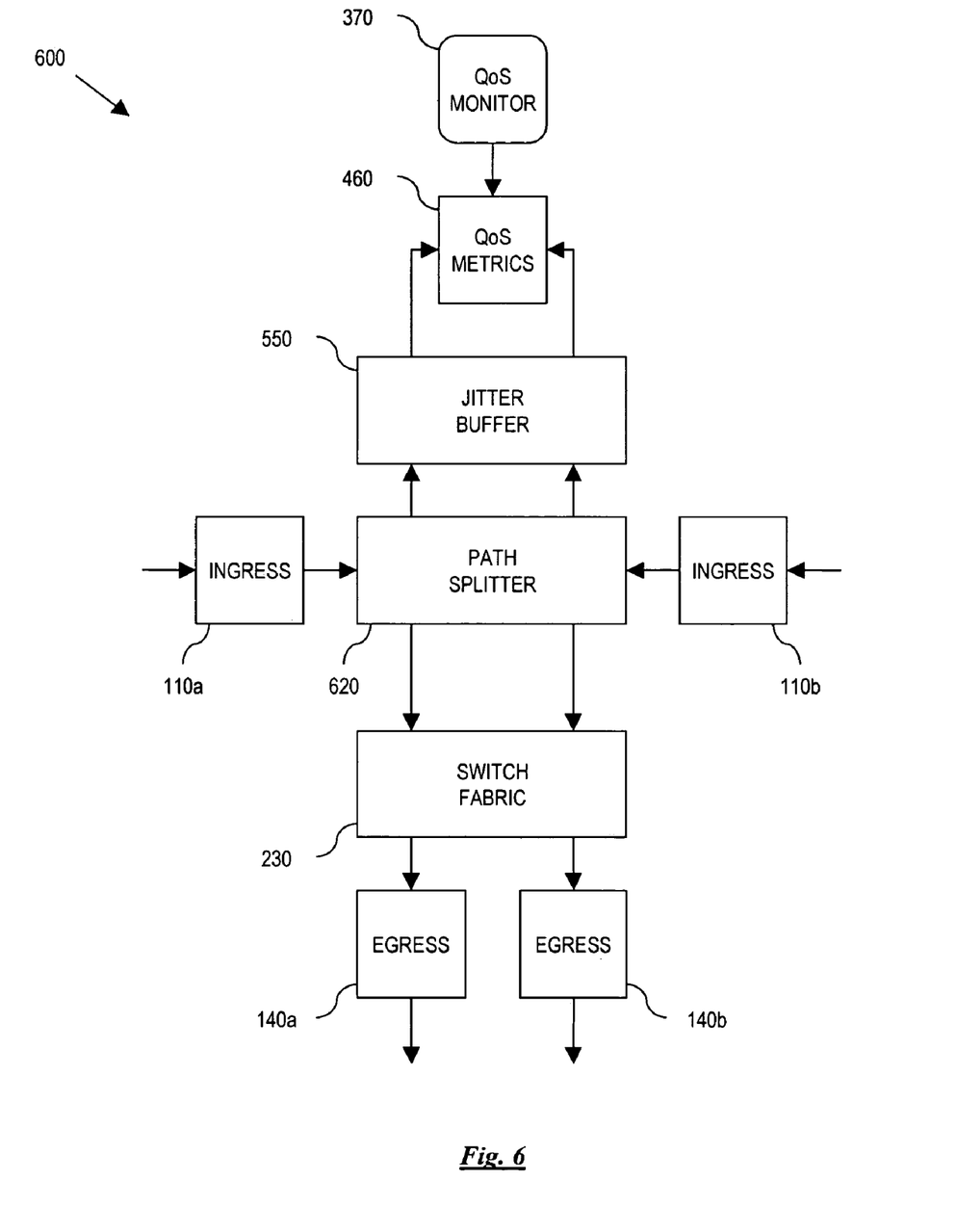
FIG. 6 is a schematic view of at least a portion of another embodiment of the apparatus shown in FIG. 1.

Referring to FIG. 6, illustrated is a schematic view of at least a portion of another embodiment of the apparatus 500 shown in FIG. 5, herein designated by the reference numeral 600. The apparatus 600 may be substantially similar to the apparatus 500, although the apparatus 600 includes (or is connected to) a common splitter 620. The splitter 620 may be substantially similar to the splitter 120 shown in FIG. 1, but may also be configured to communicate with multiple ingresses 110a, 110b, multiple jitter buffers (150 and/or 550), and/or multiple switch fabrics (130 and/or 230). The apparatus 500 may include one or more jitter buffers 150 and/or one or more jitter buffers 550, where each jitter buffer (150 and/or 550) may be configured to communicate with all or a corresponding one or more ingresses 110a, 110b, all or a corresponding one or more switch fabrics (130 and/or 230), and all or a corresponding one or more jitter buffers (150 and/or 550).

Figure 7:
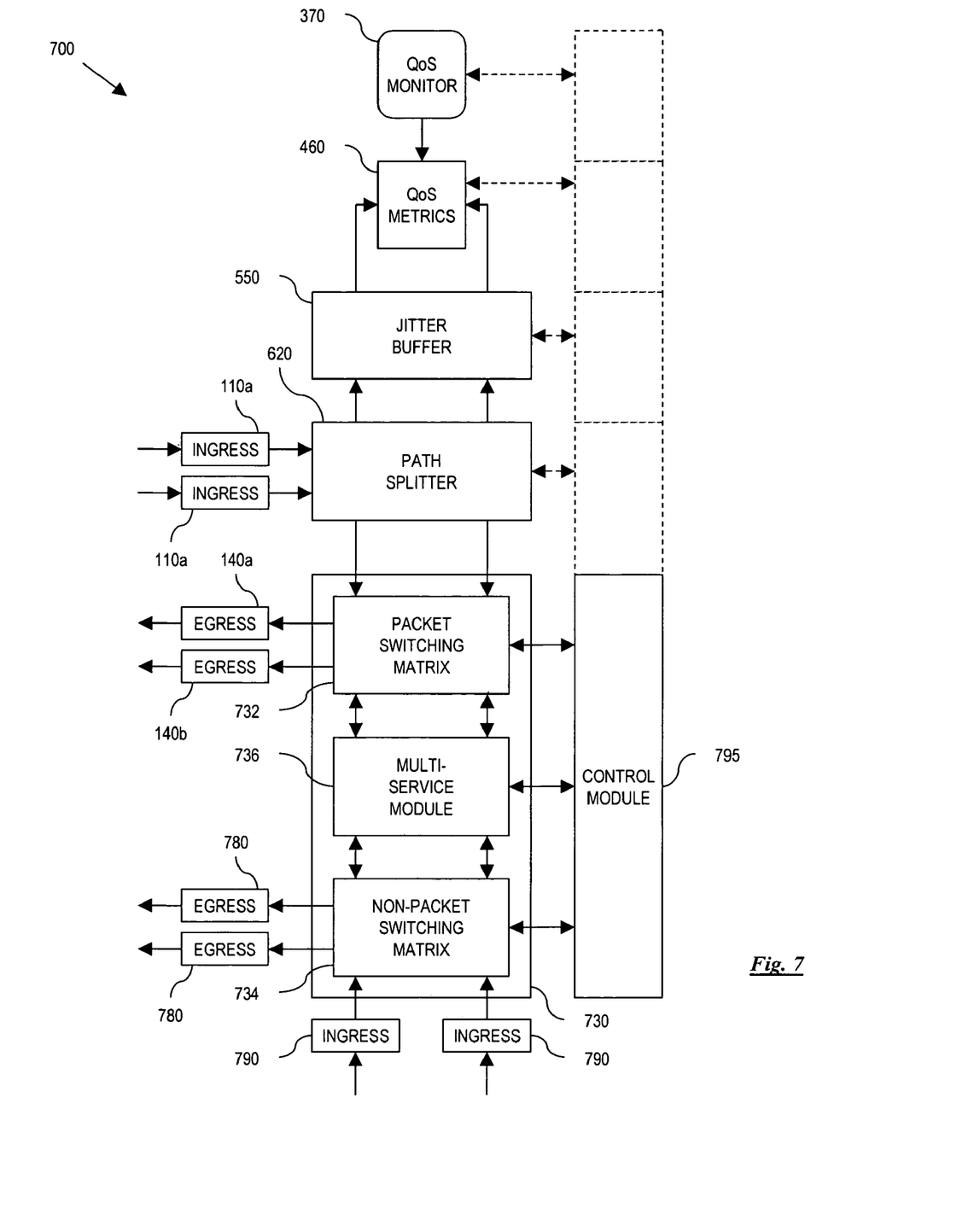
FIG. 7 is a schematic view of at least a portion of another embodiment of the apparatus shown in FIG. 1.

Referring to FIG. 7, illustrated is a schematic view of at least a portion of another embodiment of the apparatus 600 shown in FIG. 6, herein designated by the reference numeral 700. The apparatus 700 may be substantially similar to the apparatus 600, and includes a switch fabric 730 which may be substantially similar to the switch fabric 130 shown in FIG. 1.

The switch fabric 730 includes a packet switching matrix 732 and a non-packet switching matrix 734, and may also include a multi-service module 736 interposing the matrices 732, 734 or otherwise located within the switch fabric 730. Additional details regarding the components, interconnection and operation of the switch fabric 730 are included in U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 1-8, 2004.

The apparatus 700 may also include additional ingresses 790, which may transfer non-packet data to the switch fabric 730, such as to the non-packet switching matrix 734, although the ingresses 790 may also transmit packet data to the switch fabric 730. The apparatus 700 may also include additional egresses 780, which may transfer non-packet data from the switch fabric 730, such as from the non-packet switching matrix 734, although the egresses 780 may also transmit packet data from the switch fabric 730. In one embodiment, one or more of the ingresses (110 and/or 790) and the egresses (140 and/or 780) may be two-directional, configured for both ingress and egress operation.

The apparatus 700 may also includes a control module 795 configured for one-way and/or two-way communication with the switching matrices 732, 734 and the multi-service module 736, or other components of the switch fabric 730, such as for the control of such components. The control module 795 may also be configured to control or otherwise communicate with other components included in or connected to the apparatus 700, such as the splitter 620, the jitter buffer 550, the QoS metrics module 460, and/or the QoS monitor module 370.

Figure 8:
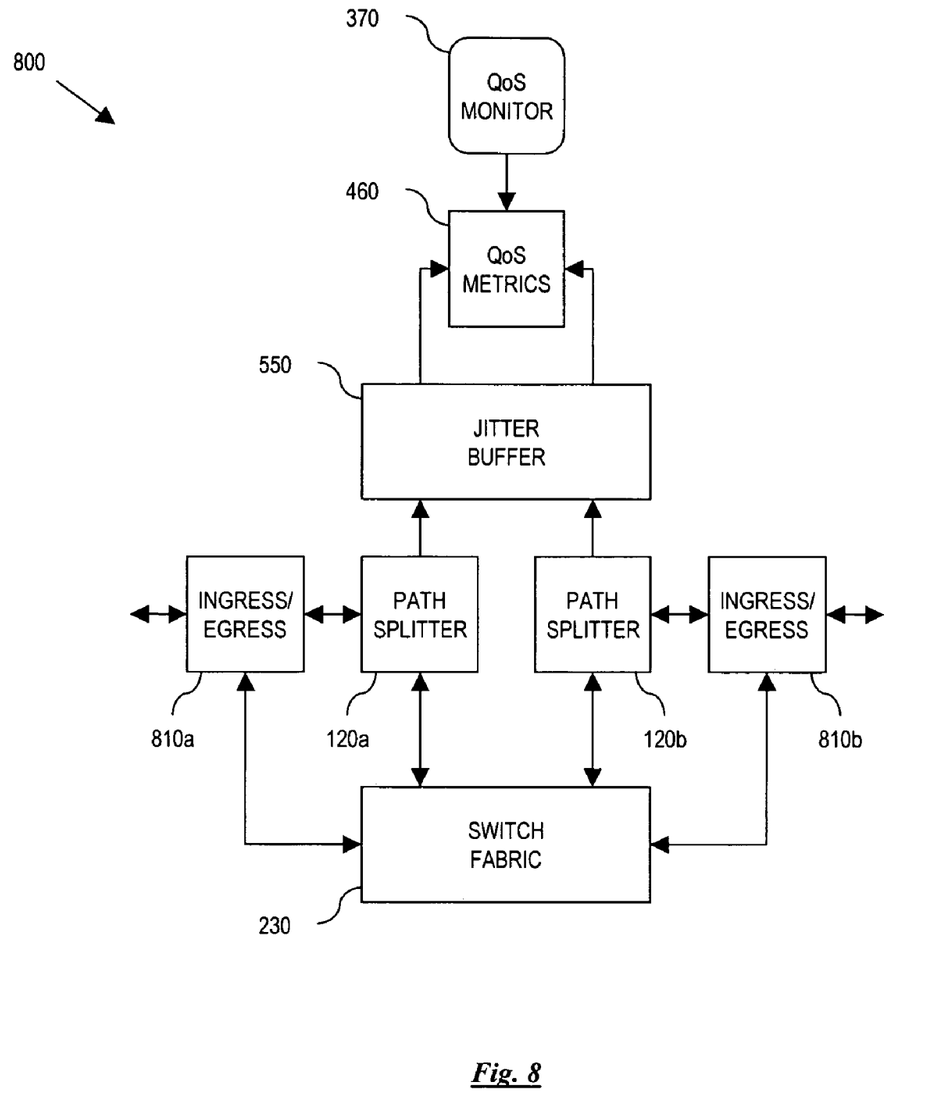
FIG. 8 is a schematic view of at least a portion of another embodiment of the apparatus shown in FIG. 1.

Referring to FIG. 8, illustrated is a schematic view of at least a portion of another embodiment of the apparatus 700 shown in FIG. 7, herein designated by the reference numeral 800. The apparatus 800 may be substantially similar to an embodiment of the apparatus 700 which includes two-directional ingress/egress components 810a, 810b, each of which may be configured to send and receive packet data and/or non-packet data, and may otherwise be substantially similar to the ingress 110 and/or the egress 140 shown in FIG. 1. Moreover, the illustrated embodiment of the apparatus 800 may permit data travel directly between the ingress/egress components 810a, 810b and the switch fabric 230 or otherwise bypassing the splitters 120a, 120b. For example, non-packet data received by the apparatus at one of the ingress/egress components 810a, 810b may be transmitted directly to the switch fabric 230, in contrast to packet data received at one of the ingress/egress components 810a, 810b which is transmitted to the switch fabric 230 via one of the splitters 120a, 120b. The switch fabric 230 may also transmit non-packet and/or packet data directly to the ingress/egress components 810a, 810b, or such data may be directed back through one of the splitters 120a, 120b prior to arriving at one of the ingress/egress components 810a, 810b.

Figures 9A, 9B, 9C:
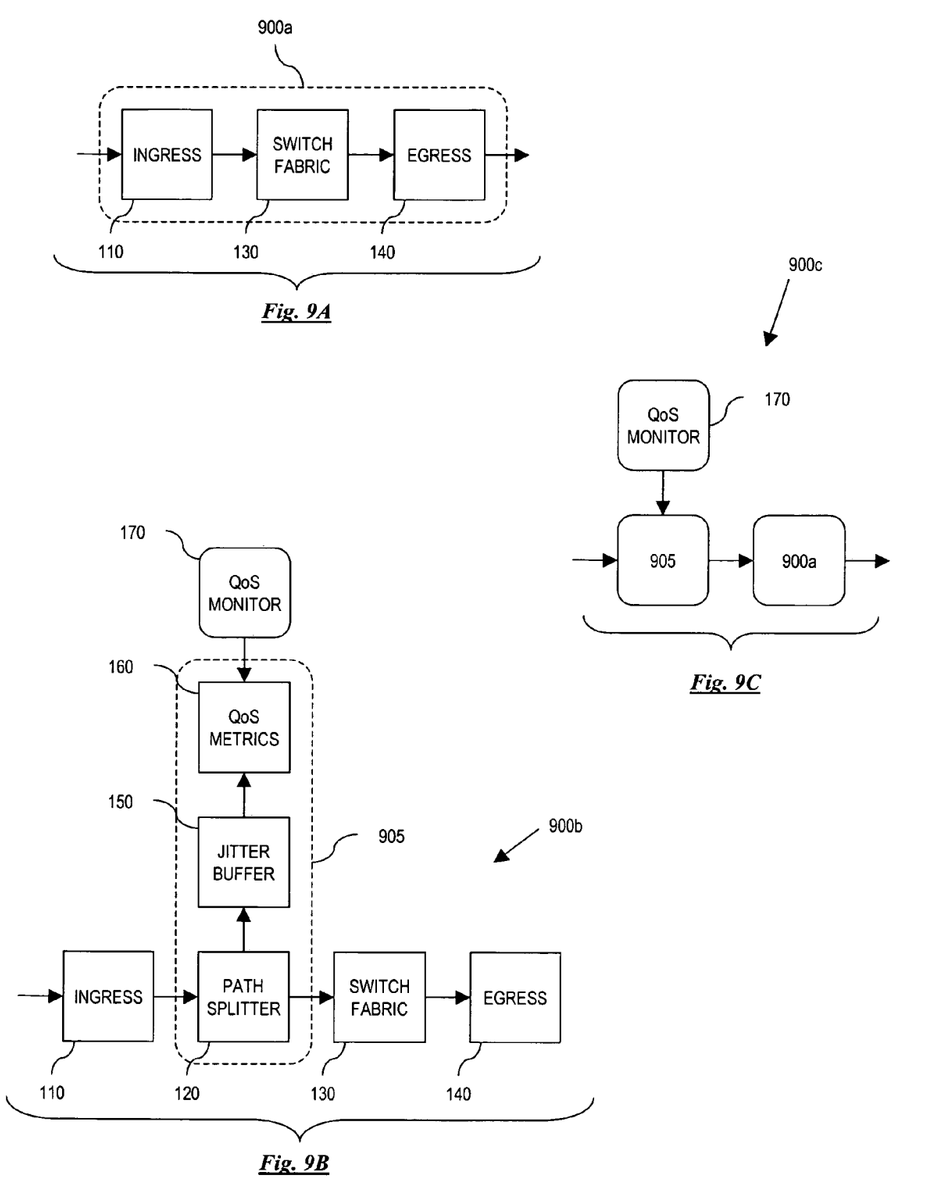
FIG. 9A is a schematic view of at least a portion of one embodiment of apparatus according aspects of the prior art.
FIG. 9B is a schematic view of at least a portion of one embodiment of the apparatus shown in FIG. 9A according to aspects of the present disclosure.
FIG. 9C is a schematic view of at least a portion of another embodiment of the apparatus shown in FIG. 9B according to aspects of the present disclosure.

FIGS. 9A-9C demonstrate the ability to retrofit existing gateways, softswitches, and/or other switching apparatus and components with apparatus and/or components according to aspects of the present disclosure. Referring to FIG. 9A, illustrated is a schematic view of a switching apparatus 900a according to aspects of the present disclosure and/or conventional switching apparatus. In the illustrated embodiment, the apparatus 900a includes a switch fabric 130 interposing an ingress 110 and an egress 140, such as those shown in FIG. 1 and described above, although the apparatus 900a may also or alternatively include one or more ingresses, egresses and/or switching fabrics other than those explicitly described in the present disclosure. The apparatus 900a is one embodiment capable of being retrofitted with one or more apparatus and/or components according to aspects of the present disclosure.

Referring to FIG. 9B, illustrated is a schematic view of at least a portion of one embodiment of the apparatus 900a after being retrofitted according to aspects of the present disclosure, herein designated by the reference numeral 900b. The apparatus 900b includes an apparatus 905 which may be substantially similar or identical to one or more of the apparatus 100, 200, 300, 400, 500, 600, 700 and/or 800 described above. For example, the apparatus 905 includes a jitter buffer 150 interposing a splitter 120 and a QoS metrics module 160, each of which may be substantially similar or identical to those shown in FIG. 1. The apparatus 905 is retrofitted to the apparatus 900a by physically and/or logically locating the splitter 120 between the ingress 110 and the switch fabric 130. Consequently, packet data transmitted from the ingress 110 to the switch fabric 130 may also be transmitted to the jitter buffer 150 and employed by the QoS metrics module 160 to assess QoS. Of course, retrofit embodiments within the scope of the present disclosure are not limited to the embodiment shown in FIG. 9B. The apparatus 900b may also include or be connected to a QoS monitor module 170 configured to cooperate with the QoS metrics module 160 to generate QoS reports or otherwise support QoS activities.

Referring to FIG. 9C, illustrated is a schematic view of at least a portion of another embodiment of the apparatus 900a after being retrofitted according to aspects of the present disclosure, herein designated by the reference numeral 900c. The apparatus 900c is substantially similar to the apparatus 900b, although the apparatus 905 retrofitted to the apparatus 900a is physically and/or logically located upstream of the apparatus 900a instead of being at least partially integrated into the apparatus 900a.

Figure 10:
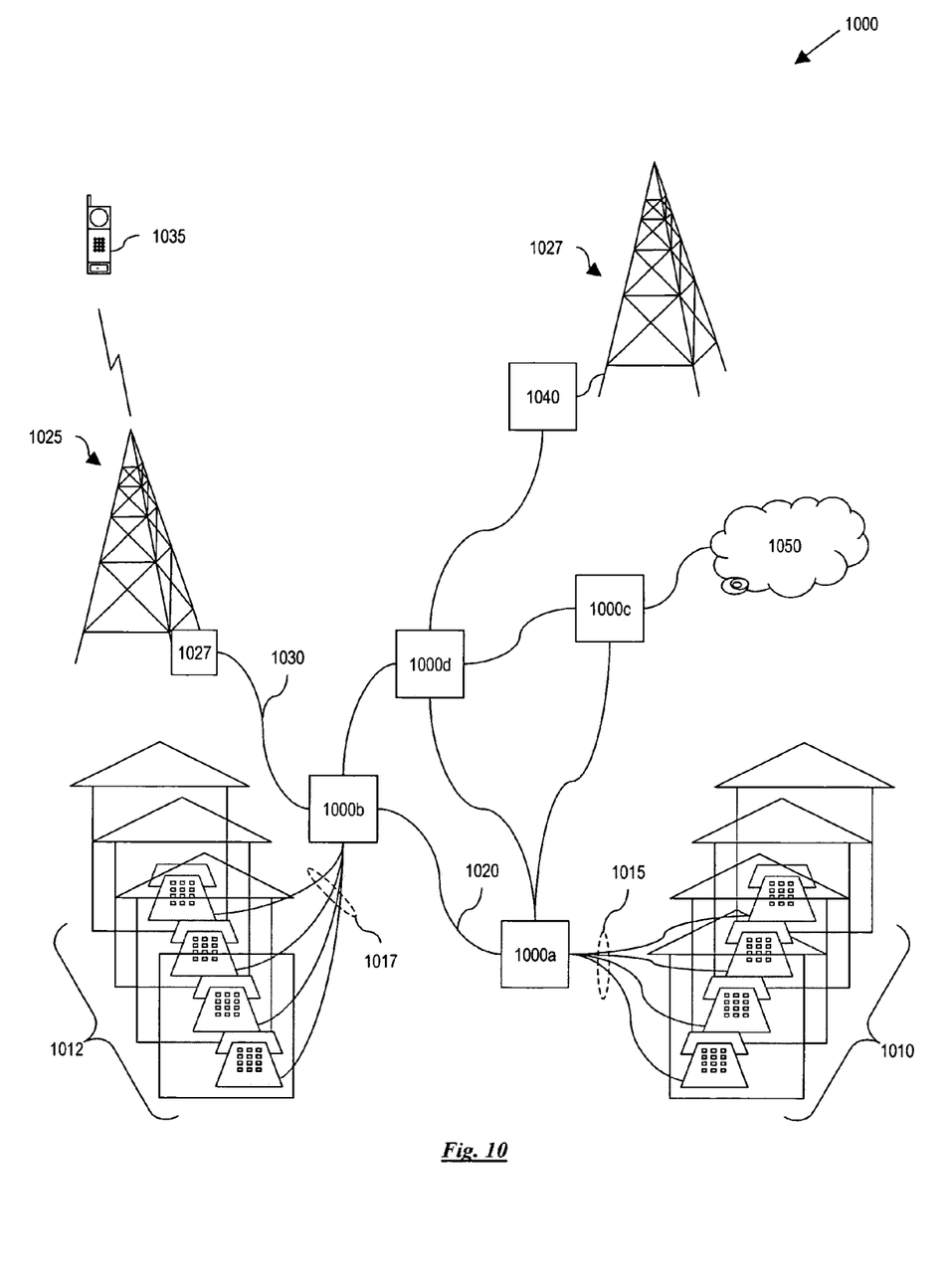
FIG. 10 is a schematic view of at least a portion of another embodiment of apparatus according to aspects of the present disclosure.

Referring to FIG. 10, illustrated is a schematic diagram of at least a portion of one embodiment of a network 1000 according to aspects of the present disclosure. The network 1000 may include several networks and/or portions thereof.

The network 1000, or portions thereof, is one environment in which the above-described apparatus 100, 200, 300, 400, 500, 600, 700, 800, 900a, 900b and/or 900c may be implemented according to aspects of the present disclosure. For example, the network 1000 includes apparatus 1000a-d, each of which may be substantially similar to the apparatus 100, 200, 300, 400, 500, 600, 700, 800, 900a, 900b and/or 900c. The apparatus 1000a-d are each configured according to their particular role in the network 1000, including the configuration of the number and type of interfaces (e.g., ingresses and/or egresses), for example.

The apparatus 1000a is connected by a plurality of loops 1015 to one or more PSTN access networks 1010 that may include a plurality of residential telephones and/or business exchanges (PBX). In one embodiment, the telephones may be grouped by digital loop carriers and/or other aggregators which, possibly in addition to one or more PBX, may be included in one or more of the PSTN access networks 1010, or may otherwise be configured to communicate with the apparatus 1000a through a PSTN network 1010. The loops 1015 may include digital loops and/or analog loops, and may be configured to transmit TDM and other PSTN data, VoIP data, DSL data, VoDSL data, and/or ATM data, among others. Thus, the apparatus 1000a may be, or may be employed as, a central office switch, or a Class 5 switch. Accordingly, any PSTN access network 1010 connected to the apparatus 1000a may communicate with another PSTN access network 1010 connected to the apparatus 1000a.

The apparatus 1000a is also connected to the apparatus 1000b by a trunk or other transmission line 1020. The apparatus 1000b is, in turn, connected to a plurality of residential telephones, business PBXs, digital loop carriers, and/or PSTN access networks (hereafter collectively referred to as PSTN access networks, although merely for the sake of simplicity) 1012 by a corresponding plurality of loops 1017, which may each be substantially similar to one or more of the loops 1015. Thus, any of the PSTN access networks 1010 may communicate with any of the PSTN access networks 1012 via the apparatus 1000a and 100b, the trunk 1020, and corresponding ones of the loops 1015, 1017.

The apparatus 1000b is also connected to a tower 1025 or tower controller 1027 by one or more copper and/or fiber cables 1030. The tower 1025 may be a base station (e.g., in a 2G wireless network) and/or a radio network station (e.g., an RNS in a radio access network (RAN) or 3G wireless network). The tower controller 1027 may be a base station controller (e.g., a BSC in a 2G wireless network) and/or a radio network controller (e.g., an RNC in an RAN or 3G wireless network), at least in part. Consequently, any PSTN access network 1012 may communicate with a wireless phone 1035 (e.g., a cellular or radio phone) within range of the tower 1025 via the apparatus 1000b, a corresponding one of the loops 1017, the cable 1030, the tower controller 1027, the tower 1025, and a wireless/radio signal between the tower and wireless phone 1035.

The apparatus 1000d is also configured to support wireless communications, and may otherwise be substantially similar to the apparatus 1000b (and/or the apparatus 1000a) except that the apparatus 1000d is not connected to any PSTN access networks. Nonetheless, a PSTN access network (e.g., network 1010 and/or network 1012) may still communicate with the apparatus 1000d, although such communications may first be transmitted through the apparatus 1000a and/or the apparatus 1000b. Consequently, the apparatus 1000d may still cooperate with a wireless portion of the network 1000.

A PSTN access network 1010 may also allow communication between other telephones (wireless or otherwise) via connection through an additional switch and/or network. For example, the apparatus 1000c is connected to the apparatus 1000a and 1000d or similar apparatus. In one embodiment, the apparatus 1000c is a tandem switch or gateway, such as may be connected to another network 1050, which may be or include an IP, ATM or other packet-based network and/or a PSTN or other non-packet based network. Thus, in some embodiments, the apparatus 1000c and/or 1000d are primarily connected to switching apparatus and other network components configured to perform switching functions. In one embodiment, the apparatus 1000c and 1000d are each connected only to instances of the apparatus 1000a-d. Thus, the apparatus 1000c and/or 1000d may each be, or may each be employed as, an interoffice switch ("tandem"), or a Class 4 switch, primarily passing voice and other data transmissions between other switches. In any of such intermediary roles, the apparatus 1000c may be configured to not include interfaces with transmission links that are directly connected to a PSTN access network. For example, the apparatus 1000c may be configured to only include interfaces with other ones of the apparatus 1000a-d.

In view of all of the above, it should be understood that the present disclosure introduces an apparatus that includes a packet data ingress, a packet data egress, and a packet data switching matrix configured to switch first packet data from the packet data ingress to the packet data egress. Such an apparatus may further include a packet data jitter buffer and a packet data splitter, wherein the packet data splitter interposes the packet data ingress and the packet data switching matrix and is configured to multicast the packet data to the packet data switching matrix and the jitter buffer.

The present disclosure also provides an apparatus comprising: (1) a plurality of interfaces including a plurality of packet data interfaces; (2) a packet data switching fabric; (3) a jitter-based quality of service (QoS) measurement module; and (4) a data path splitter configured to direct data from a first data path to each of second and third data paths. The first data path includes the data path splitter and one of the plurality of packet data interfaces. The second data path includes the data path splitter, the packet data switching fabric and one of the plurality of interfaces. The third path includes the data path splitter and the jitter-based QoS measurement module.

A method introduced in the present disclosure includes, in one embodiment, receiving packet data, transmitting the packet data to each of a switching fabric and a QoS measurement module, and switching the packet data received by the switching fabric. QoS characteristics of the packet data received by the QoS measurement module may, this, be detected, measured and/or reported by the QoS measurement module.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
a packet data ingress for receiving ingress packets, each packet having an intended destination;
a packet data egress;
a packet data switching matrix configured to switch packet data from the packet data ingress to the packet data egress for transmission to the intended destination;
a quality of service (QoS) measurement module configured to detect QoS characteristics; and
a packet data path splitter interposing the packet data ingress and the packet data switching matrix and configured to multicast the packet data to the packet data switching matrix and to the QoS measurement module, wherein packets received by the QoS measurement module are terminated by the QoS measurement module not sent by the QoS measurement module to the packet data egress.

2. The apparatus of claim 1 wherein the switching matrix is further configured to switch non-packet data.

3. The apparatus of claim 1 wherein the packet data includes universal-mobile-telecommunications-service (UMTS) data and non-UMTS data.

4. The apparatus of claim 1 wherein the packet data includes at least two data types selected from the group consisting of:
VoIP data;
VoDSL data;
ATM data;
CDMA2000 data;
ATM/AAL1 data; and
ATM/AAL2 data.

5. The apparatus of claim 1 wherein the packet data includes a plurality of packet data signals multiplexed onto one channel.

6. The apparatus of claim 1 further comprising a packet data buffer for storing packet data for analysis by the QoS measurement module.

7. The apparatus of claim 1 further comprising a QoS monitor module configured to generate QoS reports based on QoS metrics detected by the QoS measurement module.

8. The apparatus of claim 1 wherein the packet data ingress, the packet data egress, the packet data switching matrix, the packet data path splitter, and the QoS measurement module are components of a media gateway.

9. An apparatus, comprising:
a plurality of interfaces including a plurality of packet data interfaces;
a packet data switching fabric;
a quality of service (QoS) measurement module; and
a data path splitter configured to receive packet data having an intended destination and to direct the packet data from a first data path to each of second and third data paths, wherein:
the first data path includes the data path splitter and one of the plurality of packet data interfaces;
the second data path includes the data path splitter, the packet data switching fabric and one of the plurality of interfaces for transmission to the intended destination; and
the third path includes the data path splitter and the QoS measurement module, wherein packet data received by the QoS measurement module is terminated by the QoS measurement module and is not sent by the QoS measurement module to any of the plurality of packet data interfaces.

10. The apparatus of claim 9 wherein the plurality of interfaces includes a plurality of wireless network interfaces and a plurality of wireline network interfaces.

11. The apparatus of claim 9 wherein the data path splitter is one of a plurality of data path splitters that are substantially identical to each other and the first data path is one of a plurality of first data paths each including a corresponding one of the plurality of data path splitters.

12. The apparatus of claim 9 wherein the QoS measurement module is a jitter-based QoS measurement module that includes:
a QoS monitor module;
a QoS metrics module interposing the QoS monitor module and the data path splitter; and
a jitter buffer interposing the QoS metrics module and the data path splitter.

13. The apparatus of claim 9 wherein the plurality of interfaces, the packet data switching fabric, the QoS measurement module, and the data path splitter are components of a media gateway.

14. An apparatus, comprising:
a plurality of interfaces including a plurality of packet data interfaces;
a packet data switching fabric;
a quality of service (QoS) measurement module;
a data path splitter configured to direct data from a first data path to each of second and third data paths, wherein:
the first data path includes the data path splitter and one of the plurality of packet data interfaces;
the second data path includes the data path splitter, the packet data switching fabric and one of the plurality of interfaces; and
the third path includes the data path splitter and the QoS measurement module; and
a switching fabric configured to pass data along a fourth path not including the data path splitter between ones of the plurality of interfaces, wherein the data includes wireless packet data and wireline non-packet data, and wherein the switching fabric includes the packet data switching fabric.

15. The apparatus of claim 14 wherein the wireless packet data includes universal-mobile-telecommunications-service (UMTS) data.

16. The apparatus of claim 14 wherein the wireless packet data includes universal-mobile-telecommunications-service (UMTS) data and non-UMTS data.

17. A method, comprising:
receiving packet data having an intended destination;
transmitting the packet data to each of a switching fabric for transmission to the intended destination and a quality of service (QoS) measurement module;
switching the packet data received by the switching fabric; and
measuring QoS characteristics of the packet data received by the QoS measurement module, wherein the packet data received by the QoS measurement module is terminated by the QoS measurement module and not sent by the QoS measurement module to the intended destination.

18. The method of claim 17 wherein transmitting the packet data to each of the switching fabric and the QoS measurement module includes transmitting the packet data to the switching fabric and a jitter buffer included in the QoS measurement module.

19. The method of claim 17 wherein transmitting the packet data to each of the switching fabric and the QoS measurement module includes transmitting the packet data to the QoS measurement module and a packet data switching matrix included in the switching fabric.

20. The method claim 17 wherein measuring the QoS characteristics includes buffering the packet data received by the QoS measurement module.

21. The method of claim 17 wherein the packet data includes universal-mobile-telecommunications-service (UMTS) data.

22. The method of claim 17 wherein the packet data includes UMTS data and non-UMTS data.

23. The method of claim 17 wherein the receiving, transmitting, switching, measuring, and terminating steps are performed at a media gateway.

* * * * *